Sept. 20, 1949.   S. POTTERS   2,482,366
SELF-SEALING OIL TANK
Filed April 20, 1945
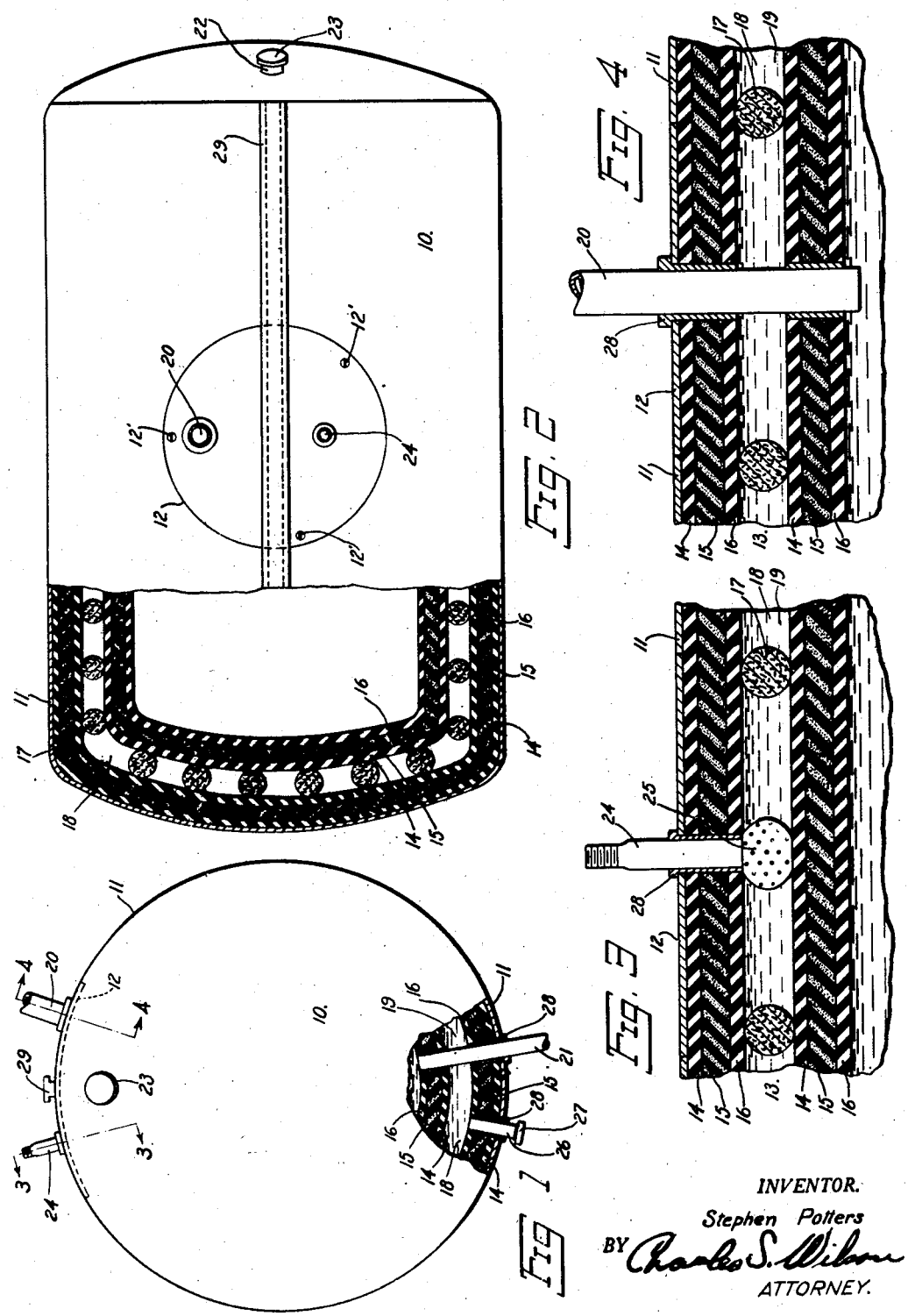
INVENTOR.
Stephen Potters
BY Charles S. Wilson
ATTORNEY.

Patented Sept. 20, 1949

2,482,366

UNITED STATES PATENT OFFICE 2,482,366

SELF-SEALING OIL TANK

Stephen Potters, Massapequa, N. Y., assignor to Republic Aviation Corporation, Farmingdale, N. Y., a corporation of Delaware Application April 20, 1945, Serial No. 589,385

4 Claims. (Cl. 154—43.5)

This invention relates to tanks or containers for the storage of fluids or other materials wherein leaks or punctures in the wall or walls thereof are sealed or closed independently of the stored fluid or material.

In substantially all prior leak-proof or self-sealing tanks the stored fluid or material is, by its nature and characteristics, essential to the sealing or closing of leaks or punctures occurring in the wall or walls of the tank. Therefore where the stored fluid or material does not possess the required nature or characteristics essential to functioning with material in or forming a part of the wall or walls of the tank to cause a relatively rapid closing or sealing of leaks or punctures, these prior art leak-proof or self-sealing tanks or containers are not and can not be considered leak-proof or self-sealing.

The present invention proposes a tank for the storage of fluids wherein the stored fluids per se perform no function in the sealing of leaks or punctures in the tank, such fluids being inert or otherwise of a character preventing any active participation in the sealing.

Among its other objects the instant invention has in view a tank or container so constructed and arranged that punctures or leaks in its walls will be rapidly sealed or closed independently of the nature and characteristics of its stored contents, at the same time protecting the contents from dilution or contamination by foreign materials or fluids.

With the above and other objects in view, as will be apparent, this invention consists in the construction, combination and arrangement of parts all as hereinafter more fully described, claimed and illustrated in the accompanying drawings, wherein:

Fig. 1 is an end view of a tank constructed according to the present invention showing part of the outer shell broken away to disclose in section the interior series of spaced linings or walls defining a chamber within and adjoining the shell together with a drain for the chamber and an outlet for oil stored within the tank;

Fig. 2 is a horizontal plan view with part of the exterior wall of the tank centrally broken away at one end to illustrate the means by which the various liners or walls are spaced or separated;

Fig. 3 is an enlarged fragmentary section taken along the line 3—3 of Fig. 1, to show the means whereby the chamber defined by the spaced linings or walls may be filled; and Fig. 4 is another enlarged and fragmentary section, along the line 4—4 of Fig. 1, to illustrate the oil return and its cooperation with the spaced linings or walls and the chamber defined thereby.

One use for the present self-sealing or leak proof tank is in the construction of combat aircraft, where it is obviously important and desirable that the oil tank for the power plant be of such a nature as to withstand the perils of combat to the end that if the tank is punctured by enemy fire, for example by machine gun bullets, the holes will be quickly and effectively sealed before any appreciable oil leakage. It is further desirable and contemplated by the present invention, that when the leak or puncture is sealed the sealing is accomplished without dilution of, damage or harmful effect to the oil within the tank to the end that the engine system or power plant may continue its operation after the puncture as well as it did before.

It has been found that some liquids, such as gasoline, will act as a solvent for uncured rubber causing it to rapidly swell and this principle has been heretofore applied in the field of combat aircraft to provide a leak-proof or self-sealing gas tank, so that upon a puncture of the tank the gasoline therein will react with the rubber and cause it to expand, thus sealing the hole and preventing escape of the gasoline. In short, the fluid within the tank is an active agent in the sealing of punctures or leaks in the wall of the tank.

On the other hand, certain fluids such as lubricating oil, will not act on rubber or the rubber lining of a tank with sufficient promptitude to cause a substantially instantaneous sealing of a leak or puncture, and as a result it has been difficult to construct a leak proof or self-sealing oil tank. It is this problem that the present invention proposes to solve and to that end there is contemplated a container or tank of any suitable size and shape, having an exterior or outside wall incorporating access means for a flexible inner container which constitutes the essence of the instant invention. This inner container comprises a series of spaced linings or walls adapted to conform to the shape of the outside shell, each wall consisting of alternate layers of vulcanized natural or synthetic rubber with an intermediate layer of uncured natural rubber. The space or chamber defined by these walls or linings is filled with a solvent for the uncured rubber such as carbon tetrachloride or gasoline. The oil itself is confined in the innermost lining or wall which separates it from contact with the chemical solvent housed in the space or chamber between the linings. It is manifest that if the container is punctured and the inner linings pierced, as by a bullet, the solvent in the space or chamber between the linings or walls will react on the uncured rubber layer to expand it and seal the puncture, thus preventing any substantial leakage of oil from the tank. At the same time, and by the same expansion of the rubber of the intermediate layer, the solvent is prevented from mingling with the oil and thereby forestalls dilution thereof or other injurious effect to the properties and quality of the oil.

The container or tank 10 contemplated herein may be of any desired size or shape, but is herein shown as cylindrical and is adapted for use as an oil tank for the engine lubricating system of a combat aircraft. It includes a hollow shell or outside wall 11 made of any suitable material, preferably metal. An aperture is provided in the wall 11 of the tank 10 by which access may be had to the interior of the shell 11 for the removal and insertion of the inner walls or linings. This opening or aperture is closed by a removable cover plate or closure 12 held in place by the screws 12'.

The inner or composite container 13 housed within the shell 11, comprises, in its preferred form two spaced walls or linings, each substantially coextensive with the inside area of the shell 11 and combining to constitute a container or tank for the oil situated in the shell 11. Each of these spaced walls or linings consists of three layers or laminations 14, 15, and 16; the outer layers 14 and 16 being composed of vulcanized natural or synthetic rubber and the intermediate layer 15 being composed of uncured or unvulcanized natural rubber. These three layers or laminations 14, 15, and 16 of each lining wall rest flush against, and are intimately sealed or connected to each other thereby creating a unitary wall or lining structure. Manifestly the outer layers 14 and 16 normally protect the intermediate layer 15 from contact with the solvent located in the chamber between the pair of walls or linings and with the oil within the tank, as well as reinforce or give shape to the lining structure.

Interposed between the spaced linings and bearing against the inner surface of the layer 16 of the outer wall and the outer surface 14 of the inner wall is a plurality of felt spacers 17, symmetrically arranged and positioned to give further support to the linings, and especially to the inner thereof, and prevent any collapse of the lining structure.

As shown in Figs. 2 and 3 and 4, the groups of layers 14, 15, and 16 are held or maintained from contact with each other by means of the spacers 17, thus defining a chamber 18. This chamber 18 is to be filled with a rubber solvent such as gasoline or carbon tetrachloride which, since the spacers 17 are of any suitable porous material, will pass through them thereby permitting the solvent to completely fill the chamber 18.

In short, the present invention contemplates a rigid exterior shell or housing 11 and a flexible inner container 13, each substantially coextensive with the other; the inner container 13 comprising a pair of spaced walls 14, 15, 16 of relatively flexible material, each of these walls being composed of outer layers of vulcanized natural or synthetic rubber 14 and 16 with an intermediate layer of unvulcanized or natural rubber 15; and each of these two walls 14, 15, 16 being spaced from each other by means of the spacers 17 whereby to provide a convenient chamber 18 for housing the solvent indicated at 19. The inner wall 14, 15, 16 is a substantial and effective barrier between the oil in the tank 10 and the solvent within the chamber 18.

Being so constructed, it is manifest that if the shell 11 should be pierced or punctured, the resulting opening or openings in one or both of the inner spaced walls will cause or permit the solvent 19 in the chamber 18 to act upon the intermediate layers or laminations 15 to thereupon expand them and seal any opening in such inner walls and thereby prevent any substantial leakage of the oil from within the inner tank 13, and at the same time preventing any mixture of the solvent 19 with the oil housed within said inner tank. It is to be noted that the action of the solvent 19 upon the intermediate layers 15 of the spaced inner walls will also prevent any substantial leakage of the solvent.

In order that the tank 10 contemplated by the present invention may function as part of a lubrication system of an engine, oil inlet and outlet ports, respectively designated 20 and 21 are provided as shown in Figs. 1 and 4 which are connected with the system in any conventional manner. The tank 10 is filled with oil by means of the filling tube 22 communicating at one end with the inner container 13 and projecting from the shell 11 at its opposite end where it has a closure or cap 23.

The solvent, indicated at 19, is injected into the chamber 18 by means of a filling tube 24 having an apertured bulb 25 at its inner end, the arrangement being such that once the solvent is expelled through the minute holes in the bulb 25 it cannot return to the tube 24. If for any reason it is desired to drain out the solvent from the chamber 18 this may be done through a drain 26 generally opposed to the filling tube 24 and having a cap or closure 27.

To insure a satisfactory and workmanlike construction, molded rubber fittings or bushings 28 are provided for the ports 20 and 21 between the oil and the exterior of the tank 10, and also for the filler tube 24 and the drain 26. The bar 29 shows an example of suitable means for attachment of the tank 10 to any fixed member of the aircraft but any other type of mounting may be employed.

The shell 11 is merely a housing for the inner spaced walls and associated parts and therefore is only incidental to the present invention. It is obvious that the shell 11 may be dispensed with without in any way affecting the operation and function of the tank 13 having the spaced walls as aforesaid, or in practice structural parts of the aircraft or other mechanism may surround and house the tank and thus constitute a substitute for the shell.

Although the example of the present invention herein shown and described relates particularly to the construction and use thereof in an oil tank for combat aircraft, manifestly the concept of the invention embraces other examples and applications wherever it is sought to provide a self-sealant container for inert substances.

What is claimed is:

1. A leak-proof oil tank comprising a rigid, metal outer shell in combination with a flexible inner shell for the reception of oil consisting of a pair of spaced composite walls defining a chamber between them, each of said composite walls comprising a central layer of uncured rubber and an outer layer of vulcanized rubber intimately adhered to each face of said central layer, spacers situated within the chamber to maintain the relative spaced positions of said composite walls, and a fluid completely filling the chamber between the composite walls which, upon the perforation of an outer layer of a composite wall, will contact the central layer of said wall causing it to swell and close the perforation.

2. A leak-proof oil tank comprising a rigid, metal outer shell in combination with a flexible inner shell consisting of a pair of spaced composite walls defining space for the reception of oil and having a chamber between them, each of said composite walls comprising a central layer of uncured rubber and an outer layer of vulcanized rubber intimately adhered to each face of said central layer, spacers situated within the chamber to maintain the relative spaced positions of said composite walls, and gasoline completely filling the chamber between the composite walls which, upon the perforation of an outer layer of a composite wall, contacts the central layer of said wall causing it to swell and close the perforation.

3. A leak-proof oil tank comprising a rigid, metal outer shell in combination with a flexible inner shell substantially coextensive with the outer shell and consisting of a pair of spaced composite walls defining a chamber between them, each of said composite walls comprising a central layer of uncured rubber and an outer layer of vulcanized rubber intimately adhered to each face of said central layer, spacers situated within the chamber to maintain the relative spaced positions of said composite walls, and gasoline completely filling the chamber between the composite walls which, upon the perforation of an outer layer of a composite wall, contacts the central layer of said wall causing it to swell and close the perforation.

4. A leak-proof oil tank comprising a pair of spaced composite walls one contained within and spaced from the other thereby creating a chamber between them and both walls surrounding and defining a reservoir for the reception of oil, each wall consisting of a central layer of uncured rubber and an outer layer of vulcanized rubber intimately adhered to each face of the central layer, the aforesaid chamber containing a fluid solvent for uncured rubber adapted to contact the central layer of either wall upon the perforation of the outer layers of said walls to cause such central layer to swell and close the perforation.

STEPHEN POTTERS.

REFERENCES CITED

The following references are of record in the file of this patent:

UNITED STATES PATENTS

| Number | Name | Date |
|---|---|---|
| 1,351,395 | Martineau | Aug. 31, 1920 |
| 1,381,175 | Ericsson | June 14, 1921 |
| 1,393,719 | De Save | Oct. 11, 1921 |
| 1,397,383 | Macbeth | Nov. 15, 1921 |
| 1,436,985 | Friant | Nov. 28, 1922 |
| 1,616,116 | De Salamanca | Feb. 1, 1927 |
| 2,331,097 | Watter | Oct. 5, 1943 |
| 2,354,701 | Pescara | Aug. 1, 1944 |

FOREIGN PATENTS

| Number | Country | Date |
|---|---|---|
| 162,813 | Germany | Sept. 18, 1905 |
| 194,806 | Great Britain | July 5, 1922 |
| 693,669 | France | Nov. 24, 1930 |
| 852,133 | France | Oct. 16, 1939 |
| 539,150 | Great Britain | Aug. 29, 1941 |
| 539,357 | Great Britain | Sept. 8, 1941 |